US008065300B2

(12) United States Patent
Gupta et al.

(10) Patent No.: US 8,065,300 B2
(45) Date of Patent: Nov. 22, 2011

(54) FINDING THE WEBSITE OF A BUSINESS USING THE BUSINESS NAME

(75) Inventors: Narendra Gupta, Dayton, NJ (US); Mazin Gilbert, Warren, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 396 days.

(21) Appl. No.: 12/075,570

(22) Filed: Mar. 12, 2008

(65) Prior Publication Data

US 2009/0234853 A1   Sep. 17, 2009

(51) Int. Cl.
*G06F 7/00* (2006.01)
(52) U.S. Cl. .......................... 707/730; 707/748; 707/944
(58) Field of Classification Search .................. None
See application file for complete search history.

(56) References Cited

U.S. PATENT DOCUMENTS

| | | | |
|---|---|---|---|
| 5,781,884 A * | 7/1998 | Pereira et al. ................. | 704/260 |
| 6,373,985 B1 * | 4/2002 | Hu et al. ......................... | 382/229 |
| 6,456,971 B1 * | 9/2002 | Mohri et al. ................. | 704/256.4 |
| 7,027,988 B1 * | 4/2006 | Mohri ............................ | 704/257 |
| 7,240,004 B1 * | 7/2007 | Allauzen et al. ............... | 704/255 |
| 2003/0061232 A1 * | 3/2003 | Patterson ..................... | 707/104.1 |
| 2003/0187644 A1 * | 10/2003 | Mohri et al. ................... | 704/256 |
| 2005/0107999 A1 * | 5/2005 | Kempe et al. ...................... | 704/9 |
| 2005/0149507 A1 * | 7/2005 | Nye .................................. | 707/3 |
| 2006/0085476 A1 * | 4/2006 | Daniels et al. ............... | 707/104.1 |
| 2006/0262910 A1 * | 11/2006 | Molnar et al. ............... | 379/88.17 |
| 2007/0005584 A1 * | 1/2007 | Feng et al. ........................ | 707/4 |
| 2008/0189263 A1 * | 8/2008 | Nagle .............................. | 707/5 |
| 2009/0089859 A1 * | 4/2009 | Cook et al. ........................ | 726/3 |
| 2009/0248595 A1 * | 10/2009 | Lu et al. .......................... | 706/12 |

OTHER PUBLICATIONS

Mohri et al., "Weighted Finite-State Transducers in Speech Recognition", Computer Speech and Language, vol. 16, No. 1, Jan 2002, p. 69-88.*
Mohri et al., "Weighted Automata in Text and Speech Processing", Proceedings of the ECAI 96 workshop, p. 46-50, Aug. 13, 1996.*
Allauzen, et al., "OpenFst: A General and Efficient Weighted Finite-State Transducer Library", CIAA 2007, LNCS 4783, pp. 11-23, Oct. 28, 2007.*
Pereira et al., "Speech Recognition by Composition of Weighted Finite Automata", in E. Roche, Y. Schabes (Eds.), Finite-State Language Processing, MIT Press, Cambridge, Ma, Jun. 1997, pp. 431-453.*

* cited by examiner

*Primary Examiner* — Neveen Abel Jalil
*Assistant Examiner* — Vei-Chung Liang

(57) ABSTRACT

A system and method are provided for augmenting information on business directory databases. Using the business name contained in a business directory database and Web data mining technology, the website of a business is found and validated, prior to enriching the database entries.

10 Claims, 5 Drawing Sheets

FINDING THE WEBSITE OF A BUSINESS USING THE BUSINESS NAME

CROSS REFERENCE TO RELATED APPLICATIONS

This application is related to U.S. application Ser. No. 12/075,581, entitled "Using Web-Mining to Enrich Directory Service Databases and Soliciting Service Subscriptions," by Narendra Gupta et al., filed on the same date as the present application, and is related to U.S. application Ser. No. 12/075, 582, entitled "Using a Local Business Directory to Generate Messages to Consumers," by Benjamin J. Stern et al., filed on the same date as the present application, the disclosures of which are hereby incorporated by reference herein in their entirety.

FIELD OF THE INVENTION

The present invention relates generally to augmenting information on business directory databases, and more particularly, to finding the Website of a business using a business name contained in a business directory database, using Web data mining technology to validate and enrich the database entries.

BACKGROUND OF THE INVENTION

Business directory database Websites, such as the YellowPages.com (YPC) Website, have brought the basic concept of traditional bound business directories into the Internet/WWW age while improving ease of use and functionality. The YPC can trace its history to 1996, when an independent publisher and two telecommunications companies (SBC and BellSouth) each launched their own online directories. They continued to operate separately until November 2004, when SBC and BellSouth entered into a partnership to create the Internet Yellow Pages joint venture, acquiring the online directory publisher then known as WWW.Yellowpages.com, Inc. The three separate sites were combined into one site called YellowPages.com. YPC offers searchable directory listings, and has capabilities to provide information on products/services provided, specialty, brands, payment options, languages spoken, certification & affiliation, coupons & deals, and user reviews. Also, when a user registers with YPC, addresses of interest, recent searches and recently viewed listings can be saved for future reference. Additionally, search information, maps and driving directions can be saved, emailed or sent by text message to a device capable of receiving this type of message.

Customers who search business listings directly are typically looking for a particular type of good or service, and are ready to purchase. The traditional bound business directories are by their nature published periodically (typically annually) and therefore not able to be changed once issued. It is very frustrating for consumers to call or worse travel to a listed business location only to find out they are no longer there or have changed their hours, and then have to start their search all over again. This is not a limitation of the YPC, as it is a live business directory database which is updated continuously as business or other conditions change.

Web and Internet based business directory databases (BDBs), such as TheYellowPages.com (or similar), contain a large number of business names, addresses and phone numbers. Only a small fraction of listings contain other frequently requested information such as the URL or domain name or business Internet address, email contact address or hours of operation. Not having a means whereby desired information is readily available or retrievable can leave consumers frustrated and possibly drive them to support those businesses that provide this information in anticipation of the request.

The terms "URL" and "domain name" are frequently used interchangeably. While related, the terms have slightly different meanings. For example, the domain name WWW.example.net corresponds to a domain that includes the URL http://www.example.net/index.html. For future reference herein, the terms URL, domain name and business internet address will all be used interchangeably.

In general terms as used in the present application, a database stores records containing data or elements with defined relationships between the data elements. For example, the following items are all individual data elements within a record in a database: Ace Food Mart, 123 Main Street, Schenectady, N.Y., USA, 12345, 555-555-5555, WWW.Acemart.com. In this case, the defined relationship between data elements is that they collectively represent one business with the following correlation: Business name, street address, city, state, country, zip code, phone number, domain name. Frequently, individual data elements or data fields within a database are augmented. For future reference herein, the terms augment, enrich, modify, change, add and delete may all be used interchangeably, indicating that something, individual data elements or an entire group of elements representing an individual business, has been changed (i.e. address change), added (i.e. new business opens) or deleted (i.e. business closed).

The Internet Corporation for Assignment Names and Numbers (ICANN) manages the assignment of domain names and IP addresses. This is facilitated through accredited domain registrars, including GoDaddy.com who register directly and Google.com who register indirectly through subcontractors. The registrant on the application for the domain name, a person or entity, is the licensee (effectively the owner) of the domain name. The administrative contact is the person designated to receive communications from the registrar related to administration of the domain name. The billing contact is the person designated to receive notices from the registrar concerning renewing the domain name by paying the registration fee. The technical contact is the person designated to receive communications related to technical matters associated with the domain name. Any person or entity named as a contact (administrative, billing or technical) has the power to adversely affect the domain name. For future reference herein, a URL or domain name is "sponsored" by an entity when the registrant and designated contacts of the URL or domain name are responsible for and engaged (either directly or indirectly) in the ongoing activities of the entity (business, non-profit, interest group, government, research institute, and the like).

Businesses that market through the YPC listing could benefit from providing users access to a validated and enriched business directory database (BDB) by:

(1) reduced traffic to their Website, where the same information is repeatedly searched for and retrieved;
(2) reduced call traffic to a switchboard or a call center to field the information requests;
(3) improved perception of the business in the mind of the customer as the business has anticipated frequently requested information and furnished it prior to asking; and
(4) increased revenue as more customers potentially do business with a firm which has anticipated frequently requested information and provided it from a trusted source.

Additionally, the provider of the Web and Internet-based business directory databases, such as The YellowPages.com (or similar) may be able to command a premium listing fee from the businesses listing in their database for all the above mentioned reasons.

It would therefore be desirable to augment the information contained in a record of a Business Directory Database and provide it to customers as they are viewing an Internet or Web-based BDB. For example, it would be desirable to provide a URL (business Internet address), hours of operation, product offerings and other information in the record. It would furthermore be advantageous to present that information as part of a listing in a validated and enriched database.

SUMMARY OF THE INVENTION

In accordance with a first aspect of the invention, there is disclosed a method for augmenting business information in a record of a business directory database, the record corresponding to a business and containing data relating to the business including at least a business name. The method generally comprises the steps of: conducting a network search using the business name as a search term; receiving results of the search including a plurality of URLs; determining confidence measures for the URLs, each confidence measure indicating a probability that the URL is sponsored by the business; selecting one of the URLs based on the confidence measure; retrieving information using the selected URL; searching the retrieved information for a match with the data contained in the record of the business directory database; and repeating the selecting, retrieving and searching steps until a match is found, and verifying the URL based on the match.

The network search may include a search of the World Wide Web and may utilize a commercial search engine.

The step of determining a confidence measure indicating a probability that the URL is sponsored by the business may comprise constructing at least one finite state machine. The finite state machines may comprise a finite state machine that is an intersection of a weighted finite state machine built from the business name and another weighted finite state machine built from a domain name in the URL. Each path of the finite state machine may represent a possible string the finite state machine can match. Each path may have an associated cost, the cost being inversely related to the likelihood of the path. The confidence measure, or likelihood, may comprise a logistic transform of the cost of the lowest-cost path in the intersection finite state machine.

The data relating to the business may further include an address of the business, wherein the step of searching the retrieved information for a match with the data contained in the record of the business directory database may include searching for a match with the address.

The method may further comprise the step of adding the verified URL to the corresponding business record in the business directory database, and may further comprise the step of adding information retrieved using the selected URL to the corresponding business record in the business directory database.

In accordance with a second aspect of the invention, there is disclosed a method for augmenting business information in a record of a business directory database, the record corresponding to a business and containing data relating to the business including at least a business name. The method generally comprises the steps of: conducting a network search using the business name as a search term; receiving results of the search including a plurality of URLs; selecting a subset of the URLs based on confidence measures for the URLs, each confidence measure indicating a probability that the URL is sponsored by the business; verifying one URL of said subset by matching data retrieved using the URL with data contained in the business directory database record; and augmenting the record in the business directory database with data retrieved using the URL.

The network search may be a search of the World Wide Web or utilize a commercial search engine.

The step of determining a confidence measure indicating a probability that the URL is sponsored by the business may comprise constructing at least one finite state machine.

In accordance with a third aspect of the invention, there is disclosed a computer-usable medium having computer readable instructions stored thereon for execution by a processor to perform methods as described above.

These aspects of the invention and further advantages thereof will become apparent to those skilled in the art as the present invention is described with particular reference to the accompanying drawings.

DESCRIPTION OF THE INVENTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

An important consideration for consumers to use a specific directory service (such as the YellowPages.com) is the quality and quantity of information provided. This invention leverages Web data mining technology to visit Websites with the goal of validating and enriching a business directory database (BDB) with frequently requested information. For example, the business Internet address or URL of only a small fraction of businesses is available in most databases. The present invention is directed to a method of reliably finding and validating the URL of a business given commonly available database information such as its name, and other information like address and phone number. Finding the URL of a business (and subsequently validating and enriching the BDB) is only one exemplary use of the present invention, as the system and methodology could apply to any other business information not readily available in existing BDBs. Such other business information may include, but is not limited to, hours of operation, product lines carried or credit cards accepted.

Figure 1:
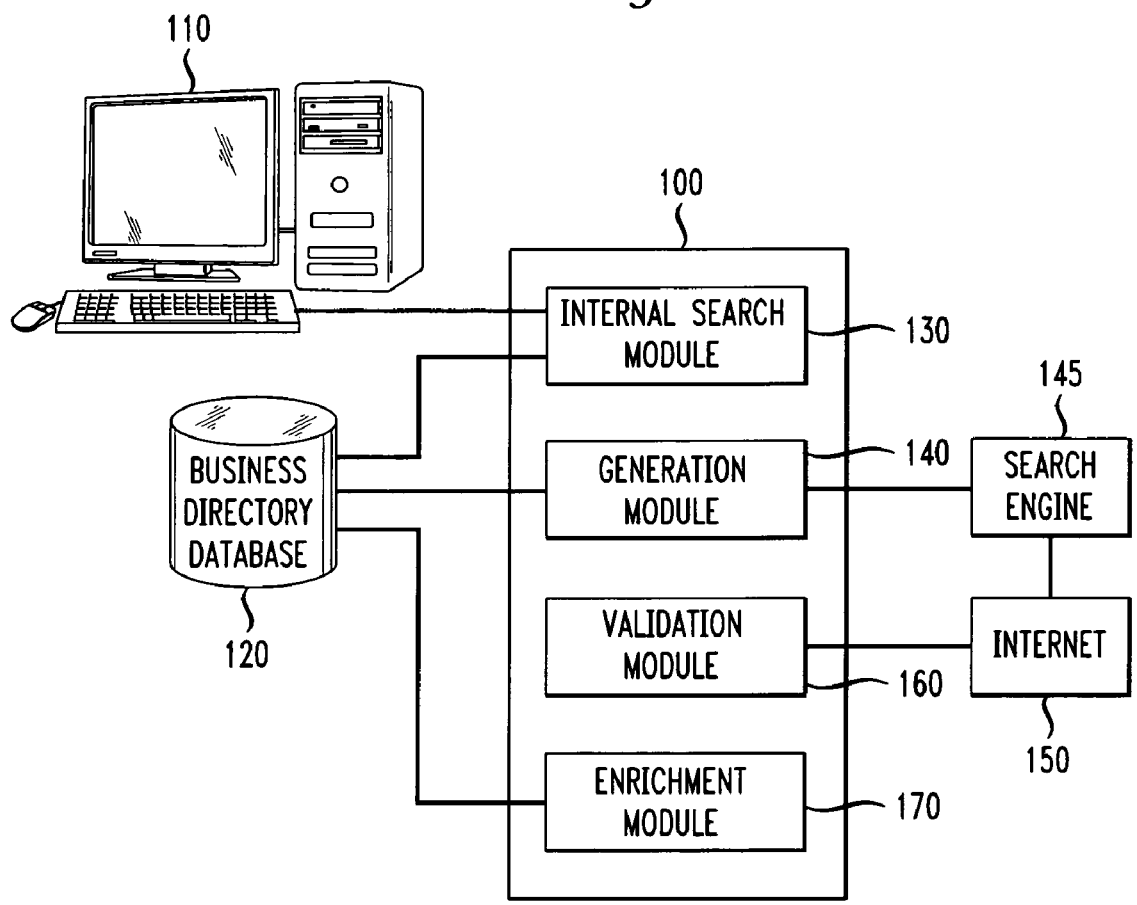
FIG. 1 is an illustrative system of an embodiment of the present invention for finding the Website of a business using the business name.

FIG. 1 illustrates a system 100 of the present invention for finding and validating the Website of a business using the business name. The system is typically launched as either a distinct process initiation (specific request to run) or as a daemon (running in the background). For illustration purposes, a user interface 110 is used to launch the system (process initiation or daemon). It should be understood that the process may be initiated automatically by a daemon.

In response to a distinct process initiation (inputting a particular business name), the internal search module 130 searches the Business Directory Database (BDB) 120. The internal search module 130 determines if the BDB already contains the requested information as it may have been included in the original database data or added through a prior enrichment. If the requested information is found in the BDB 120, it is returned to the user interface 110. If the requested information is not found in the DBD 120, or if it is desired to verify information found in the database, the generation module 140 is started. Alternatively, if the system 100 is running a daemon, the generation module 140 is started directly.

For future references herein, the term Internet will generally refer to (but in no way be limited to): the World Wide Web (WWW), public, private, university, research laboratory search engines or databases, fee or subscription databases or other accessible sources of information.

The generation module 140 uses the company name as a query to search the Internet 150 using a commercial search engine 145 or a plurality of search engines, such as Google® or Yahoo!®. The search engine 145 returns a plurality of possible URLs or Website addresses to the generation module 140. A string matching algorithm within the generation module 140 assigns a confidence measure to each URL returned by the search engine 145, indicating the possibility of being the actual URL of the business. For example, if searching for "Ace Food Mart" the search returns two URLs www.AceMart.com and www.AceFoodMartket.com, an algorithm may assign higher confidence to the first URL than to the second one. A novel method using weighted finite state machines (FSM) may be used to implement the matching procedure, within the generation module 140. Further details about the FSM methodology and an exemplary application relating to the current invention will be discussed in the detailed description with reference to FIGS. 2-4.

The generation module 140 passes the top "N" number of URLs from the list of URLs found and weighted by the string matching algorithm to the validation module 160. The determination of the appropriate number for "N" may be based on available processing resources, experience and/or other means. The top URLs are determined based on their respective weights.

In the validation module 160, URLs are validated by retrieving information like business address and/or telephone number using the URL in question (through the Internet 150) and corroborating that information with data already contained in the BDB 120. More specifically, the highest weighted URL provided by the generation module 140 is visited and searched, looking for data (say a phone number, an address or the like) already contained in the BDB 120. A refinement of this search may comprise searching for text or a link associated with "Contact Us." Many business Web sites provide a "Contact Us" page or link where they provide commonly requested information such as their address, phone number and other ways to contact them. By following the "Contact Us" path, the Web page's text is searched for known data. In addition to validating the URL itself, data already contained within the record, such as address and phone number, may also be validated using this technique.

The search algorithm within the validation module 160 will determine how to search, where to search and when to abandon a search of information located at a URL. Searches within a URL will end with validation or not. Abandonment rules contained within the validation module 160 determine at what point a search of a URL should be abandoned, and a similar search should be initiated on the next-highest weighted URL. If a URL is validated, this information is passed to the enrichment module 170 and passed to the user interface 110, if appropriate. If, however, all "N," URL's provided by the generation module 140 are searched and none validated, validation has failed and no information will be passed to the enrichment module 170. Additionally, a notification of the validation failure may be passed to the user interface 110, if appropriate.

The enrichment module 170 adds or updates files within the actual BDB 120 only after the data in question (i.e. URL, email address, . . . ) has been validated.

The generation module 140 may utilize one or more Finite State Machines (FSMs) to evaluate the confidence measure for each URL. FSMs can be viewed as a representation of a set (possibly infinite) of strings. Using knowledge of how businesses choose their domain names, a pair of weighted FSMs are generated, one from the business name and another from the domain name (in the example, the domain names are AceFoodMart and AceMart, respectively). Individual FSMs represent possible transformations from Business Name to Domain Name and vice versa. Weights in the FSMs are intended to capture the likelihood of each transformation. The intersection of those two FSMs is taken to generate all possible matches between the two sets of strings (represented by the two FSMs), and the likelihood of the string with highest value (best path through the FSM) is taken as the highest likelihood the URL in question is the desired URL.

The following background knowledge of how organizations select a URL for their firm could be used in building a FSM. This example is in no way limiting, but is intended to be an example of knowledge used in building an FSM model, as known by those skilled in the art.

Background Knowledge for Building FSMs:
(1) It is highly likely that the first character of each word in the business name is in the URL (domain name);
(2) It is highly likely that the first two characters of each word in the business name are in the URL;
(3) It is somewhat likely that characters starting from second position to the end of a word in business name are in the URL;
(4) It is less likely that characters starting from third position to the end of a word in business name are in the URL;
(5) It is highly likely that prefix characters in the URL are also in the business name; and
(6) It is highly likely that the suffix of the URL is also in the business name, but this likelihood reduces as the size of the suffix is reduced.

In generating FSMs, relative weights are assigned to reflect "highly likely," "somewhat likely," "less likely," and other grades of relative likelihood.

Figure 2:
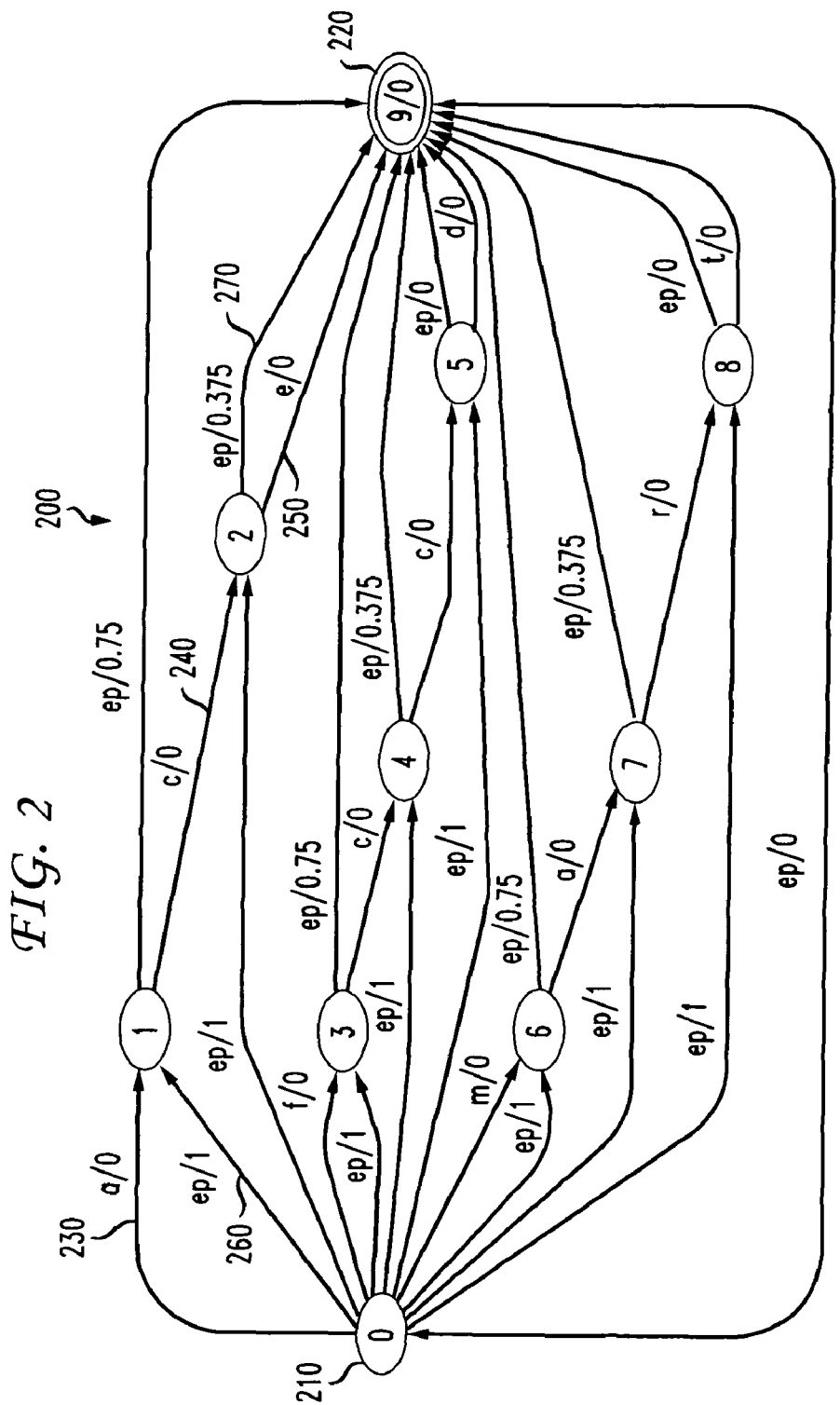
FIG. 2 is an illustrative Finite State Machine (FSM) encoding possible domain names from the business name.

FIG. 2 is an illustrative Finite State Machine (FSM) 200 encoding possible domain names from the business name. A FSM composed of a finite number of states and transition arcs between those states. A state stores information about the past by representing the changes from inception to the present moment. A transition from one state to another takes place only when conditions described on the arc connecting the two states are satisfied. Referring to FIG. 2, state 210 (labeled "0" and indicated with a single oval) is the starting state, and state 220 (labeled "9/0" and indicated with a double oval) is the end state. For an FSM to match a sequence (in this case a sequence of letters in a string), the sequence must satisfy the conditions on any set of arcs connecting a start state to the end state. The total cost of the arcs traversed is the cost of the match. Lower cost is associated with higher likelihood while higher cost is associated with lower likelihood of match.

Starting from state 210 there are many paths to state 220. Each path represents a possible string an FSM can consume, which in this instance means "match." Labels on arcs have a two-part representation: symbol or letter, followed by the cost. Arc 230, for example, is labeled "a/0," representing the letter "a" and cost 0. Traversing the arc consumes the symbol at the cost. Symbol "ep" indicates no symbol is consumed when the arc is traversed, while the cost is incurred.

FSM 200 shown in FIG. 2 encodes the business name "Ace Food Mart" with expert knowledge for matching all possible domain names of a business. In this example, there is a section for each word in the business name. For the first word "Ace," there are many ways to move from state 210 to state 220. Three possible ways (of many ways) are shown below:

| Letters Included | Path | Total Cost |
| --- | --- | --- |
| Ace | 230-240-250 | 0 + 0 + 0 = 0 |
| Ce | 260-240-250 | 1 + 0 + 0 = 1 |
| C | 260-240-270 | 1 + 0 + 0.375 = 1.375 |

Similar determination of costs can be made for the "Food" and "Mart" paths shown in FIG. 2.

FSM 200 consumes each word of the original string with no cost, and their sub-strings (not including all the letters in the name) with higher costs. This FSM is designed such that the URL containing all the words in the business name has 0 total cost (are highly likely) and those URLs containing sub-strings of words in the business name have higher costs (are less likely). The weights on the arcs are the expert knowledge transformed into a mathematical model which can now be optimized by the FSM model taking into consideration how businesses pick domain names. In this example, experts have determined that businesses prefer to include the first letters of each word in their business name in their domain name, thus an arc passing through the first letter of each word incurs a low cost of inclusion while an arc bypassing the first letter has a high cost of exclusion. For example, bypassing or not including the letter "A" has a cost of 1, while inclusion has a cost of 0. Additionally, experts have determined that businesses prefer to compose their domain names with larger portions of each word of their business name. The model embodies that preference by reducing a cost associated with exclusion of each letter after the first letter of each word. For example, bypassing or not including the letter "e" of "Ace" only has a cost of 0.375 (compared to a cost of 1 for bypassing the letter "A"), while inclusion has a cost of 0.

Figure 3:
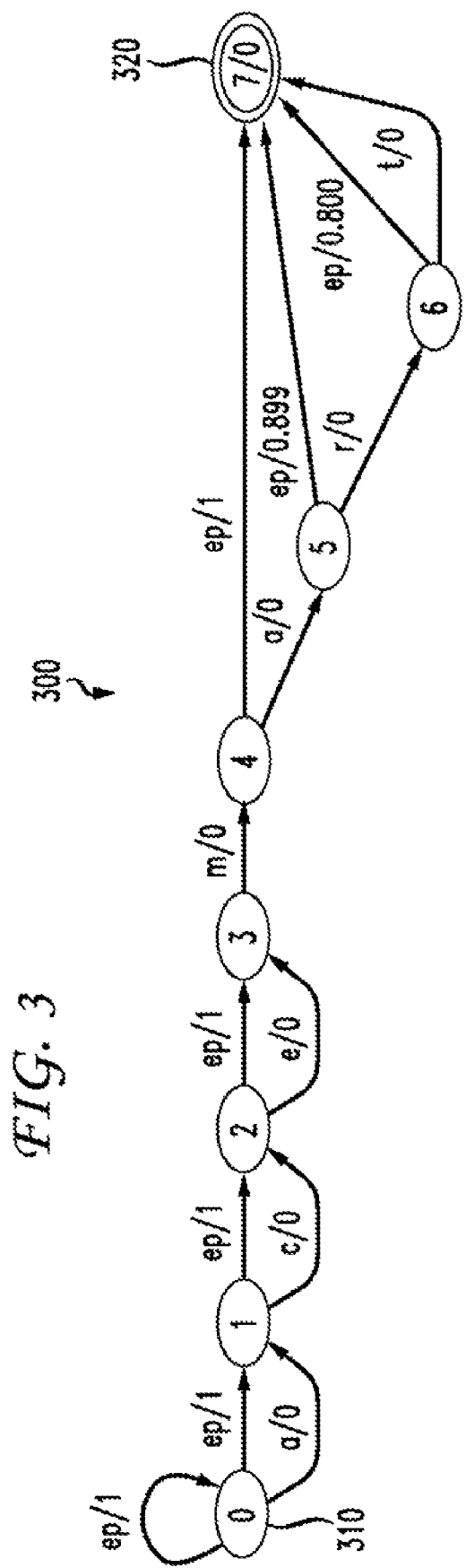
FIG. 3 is an illustrative Finite State Machine (FSM) encoding possible domain names of a URL.

FIG. 3 shows an illustrative Finite State Machine (FSM) 300 encoding possible domain names of a URL. As with FSM 200 (see FIG. 2), this FSM also has a starting state 310 (labeled "0") and an end state 320 (labeled "7/0"). The domain name of a business may contain strings that are not part of the business name. Therefore, it is possible that none of the domain names represented by FSM 200 will match the domain name in the URL. With this expert information in mind, FSM 300 is constructed from the domain name in the URL. FSM 300 is intended to capture possible extensions of the domain names generated by FSM 200. FSM 300 encodes possible variations in domain name by dropping letters from its head and/or tail. Dropping letters has an associated cost, similar to the cost associated with letter omission in FSM 200. Specifically, for FSM 300, experts have encoded the rule that domain names not dropping any letters or sub-section of a business name are more likely than those where parts of its head and/or tail are dropped. FIG. 3 shows FSM 300 for the domain name www.Acemart.com. To prepare for the execution of the search algorithm, the "www." and ".com" portions of the domain name are removed. In this example, the algorithm assigns a cost of 0 to the full term "Acemart", while removing a single letter from the head (i.e. "cemart") increases the cost to 1, and removing two letters from the head (i.e. "emart") increase the cost to 2. Similarly, the algorithm increases the cost with each letter dropped from the tail. However, the cost increase associated with each letter dropped from the tail is not nearly as substantial as for each letter dropped from the head. In this example, the cost of dropping the "t" from "acemart" is 0.800, the cost of dropping the "rt" is 0.899 and the cost of dropping the "art" is 1.000. Again, the FSM is designed such that the lower total cost represents higher likelihood while higher total cost represents lower likelihood.

Figure 4A:
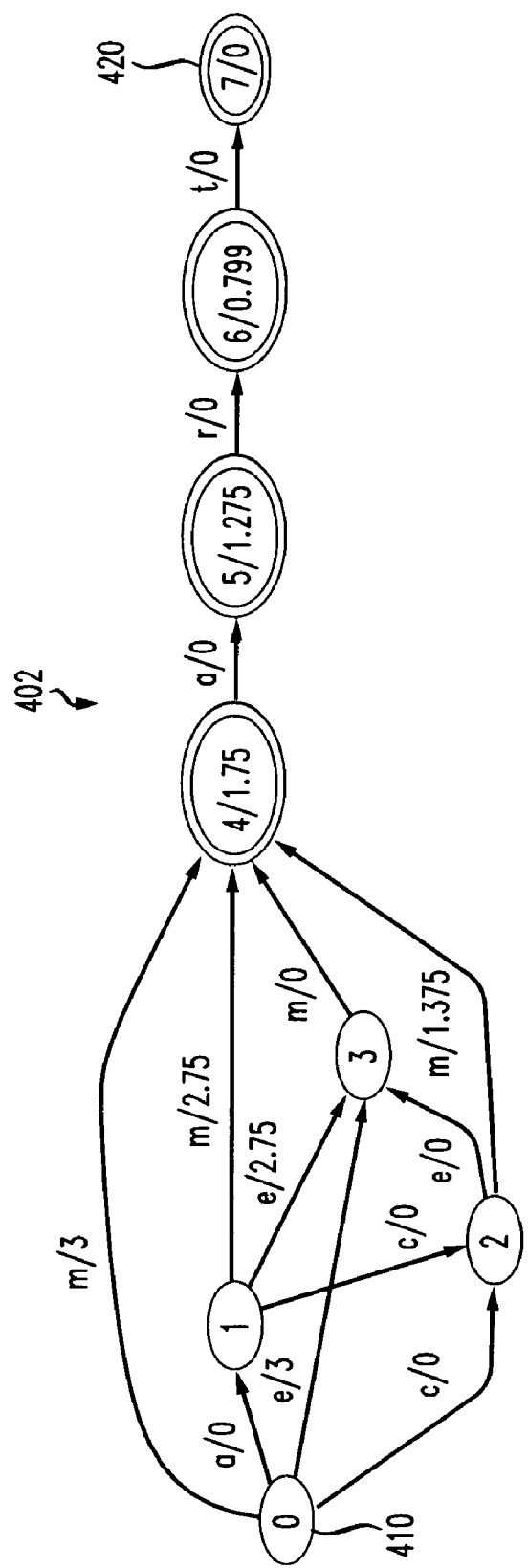
FIG. 4 is an illustrative Finite State Machine (FSM) that is the intersection of two FSMs of the current invention.
Figure 4B:
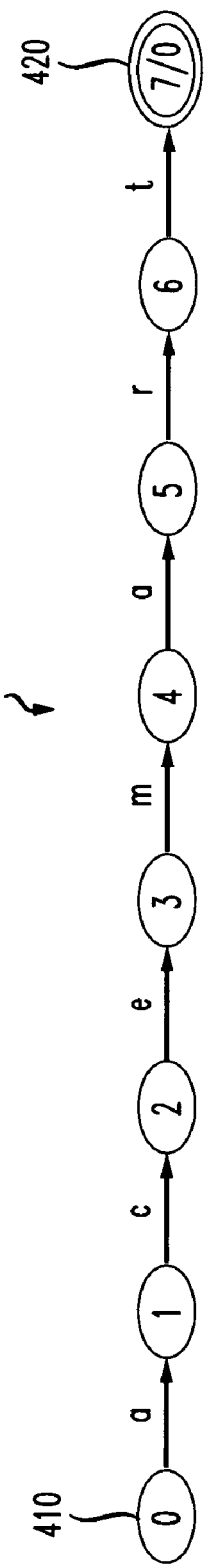

FIG. 4 shows a FSM 402 that is the intersection of FSM 200 and FSM 300 of the current invention. FIG. 4a is illustrative of the entire FSM 402, while FIG. 4b is illustrative of just the best (lowest cost) path 404. Just as in the earlier FSMs discussed with reference to FIGS. 2 & 3, this FSM has a state 410 (labeled "0") and an end state 420 (labeled "7/0"). According to FSM methods, the intersection of two FSMs is yet another FSM which consumes (matches) only those sets of strings that can be consumed (matched) by both FSMs individually. There may be a case where what is returned is an empty FSM. In such a case there does not exist a string that can be individually consumed by both FSMs and therefore there is no match between the strings represented by the individual FSMs. That, however, is not the case in this example. The best (minimum cost) path shown in FIG. 4b, between FSM 200 and FSM 300, is found by using the well-known Viterbi Algorithm on the intersected FSM 402 shown in FIG. 4a, and its cost therefore represents the best degree of match. Again, as in earlier portions of this FSM modeling methodology, experts have determined costs which are related to likelihoods. In this context a logistic transform of cost results in a number between 0 and 1, which is interpreted as the probability of the domain name belonging to the business name. For this example the optimal path (FIG. 4b) has 0 cost, which corresponds to probability of 1 or 100%. The output of FSM 402, therefore, is the Website or URL of WWW.Acemart.com.

Figure 5:
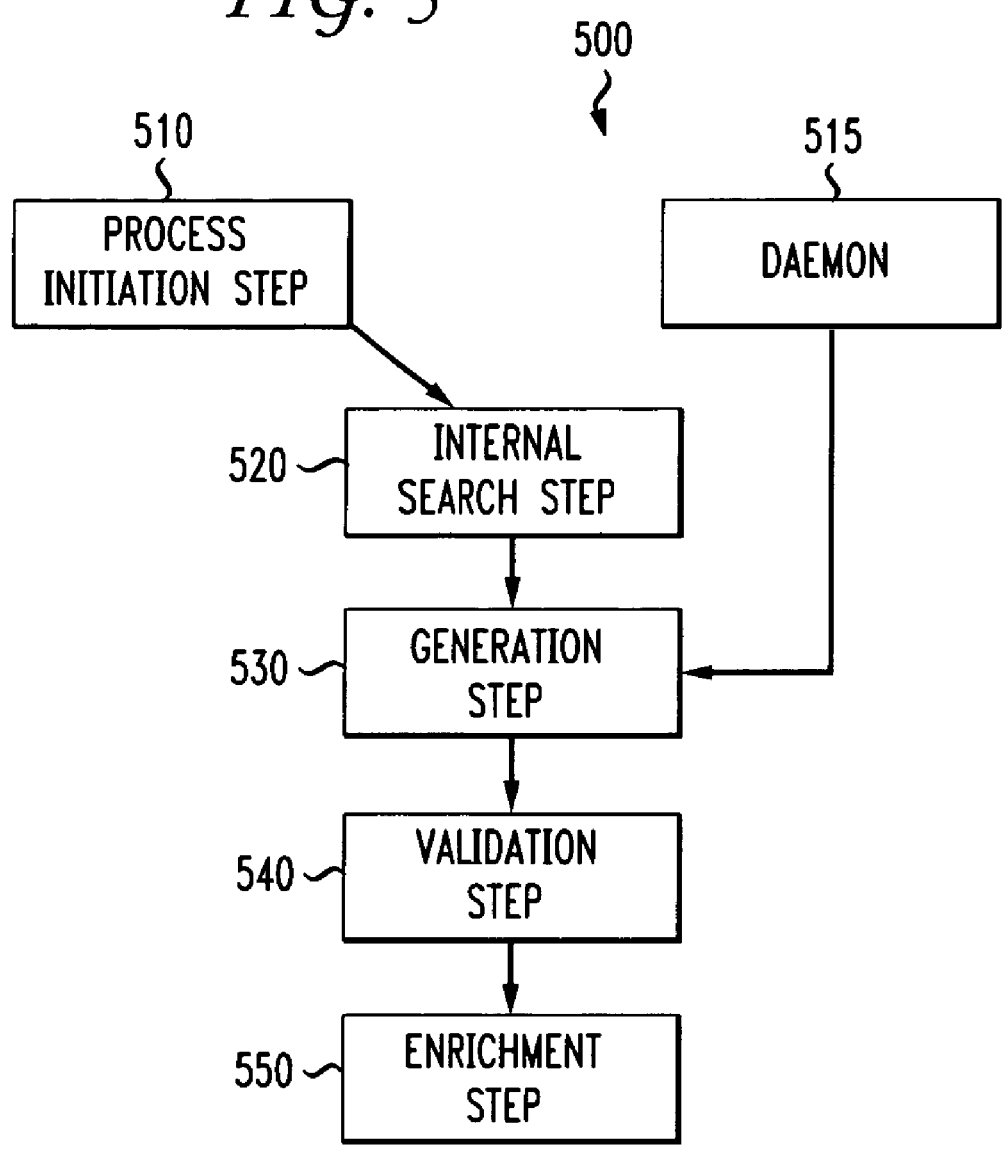
FIG. 5 is a method illustrating an embodiment of the present invention for finding the Website of a business using the business name.

FIG. 5 is a method 500 of the present invention for finding and validating the Website of a business using the business name. A business directory database (BDB, not shown) in its initial state contains very basic business information such as business name, address and phone number.

The process is typically launched as either a distinct process initiation step 510 (specific request to run) or a daemon 515 (running in the background). In response to a distinct process initiation step 510, the method moves to the internal search step 520 to search the BDB directly for the requested information. If the requested information is found already contained within the BDB, it is returned to the user and the method is complete. If the requested information is not found in the BDB, the method moves to the generation step 530.

Alternatively, when a daemon is launched, the method moves directly to the generation step 530.

The generation step 530 executes the search on the Internet (not shown), returns a plurality of URLs, and assigns a confidence measure to each URL per the aforementioned possible algorithm(s).

The validation step 540 validates data by finding information like business address and/or telephone number on the URL's Website in question and corroborating it with data already contained in the BDB.

The enrichment step 550 will perform the task of actually adding or updating data files in the BDB only after the data in question (i.e. URL, email address, . . . ) has been validated.

The invention offers a number of benefits to both the users of, and the businesses listed in, a BDB. The users could receive better information and may visit the BDB more often. Increased traffic to a business' Web site as a result of the listing in the BDB could be an incentive for the businesses to pay a premium for the listing.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that various modifications will be implemented by those skilled in the art, without departing from the scope and spirit of the invention.

We claim:

1. A method for augmenting business information in a record of a business directory database, the record corresponding to a business and containing data relating to the business including at least a business name, the method comprising:
   conducting a network search using the business name as a search term;
   receiving results of the network search including a plurality of URLs;
   determining confidence measures, each confidence measure being associated with one of the plurality of URLs, each confidence measure indicating a probability that a URL with which the confidence measure is associated is sponsored by the business;
   selecting a target URL based on a comparison of the confidence measures;
   conducting, within a domain corresponding to the target URL, a domain search for a match with the data contained in the record of the business directory database;
   if no match is found in the domain search, selecting a next target URL based on the comparison of the confidence measures, and repeating the conducting a domain search for a match within a domain corresponding to the next target URL; and
   if a match is found in the domain search, verifying the target URL based on the match;
   wherein determining confidence measures comprises constructing, for each confidence measure, a finite state machine that is an intersection of a weighted finite state machine encoding the business name and a weighted finite state machine encoding a domain name in the URL with which the confidence measure is associated, and wherein each path of the finite state machine represents a possible string the finite state machine can match, and wherein each path has an associated cost, the cost being inversely related to the likelihood of the path; and
   after verifying the target URL, adding the target URL to the corresponding business record in the business directory database.

2. The method of claim 1, wherein the network search is a search of the World Wide Web.

3. The method of claim 1, wherein the network search utilizes a commercial search engine.

4. The method of claim 1, wherein each confidence measure comprises a logistic transform of the cost of the lowest-cost path in the intersection finite state machine.

5. The method of claim 1, wherein the data relating to the business further includes an address of the business, and
   wherein conducting a domain search for a match with the data contained in the record of the business directory database includes searching for a match with the address.

6. The method of claim 1, further comprising:
   adding information retrieved using the target URL to the corresponding business record in the business directory database.

7. A method for augmenting business information in a record of a business directory database, the record corresponding to a business and containing data relating to the business including at least a business name, the method comprising:
   conducting a network search using the business name as a search term;
   receiving results of the network search including a plurality of URLs;
   selecting a subset of the plurality of URLs based on a comparison of confidence measures, each one of the confidence measures being associated with one of the plurality of URLs, each confidence measure indicating a probability that a URL with which the confidence measure is associated is sponsored by the business;
   verifying a desired URL of the subset by conducting, within domains corresponding to each URL of the subset of the plurality of URLs, domain searches for data matching data contained in the business directory database record; and
   augmenting the record in the business directory database with data found in the domain searches within the domains;
   wherein each confidence measure is determined by constructing a finite state machine that is an intersection of a weighted finite state machine encoding the business name and a weighted finite state machine encoding a domain name in the URL with which the confidence measure is associated, and wherein each path of the finite state machine represents a possible string the finite state machine can match, and wherein each path has an associated cost, the cost being inversely related to the likelihood of the path; and
   after verifying the target URL, adding the target URL to the corresponding business record in the business directory database.

8. The method of claim 7, wherein the network search is a search of the World Wide Web.

9. The method of claim 7, wherein the network search utilizes a commercial search engine.

10. A non-transitory computer-usable medium having computer readable instructions stored thereon for execution by a processor to perform a method for augmenting business information in a record of a business directory database, the record corresponding to a business and containing data relating to the business including at least a business name, the method comprising:

conducting a network search using the business name as a search term;

receiving results of the network search including a plurality of URLs;

determining confidence measures, each confidence measure being associated with one of the plurality of URLs, each confidence measure indicating a probability that a URL with which the confidence measure is associated is sponsored by the business;

selecting a target URL based on a comparison of the confidence measures;

conducting, within a domain corresponding to the target URL, a domain search for a match with the data contained in the record of the business directory database;

if no match is found in the domain search, selecting a next target URL based on the comparison of the confidence measures, and repeating the conducting a domain search for a match within a domain corresponding to the next target URL; and if a match is found in the domain search, verifying the target URL based on the match;

wherein determining confidence measures comprises constructing, for each confidence measure, a finite state machine that is an intersection of a weighted finite state machine encoding the business name and a weighted finite state machine encoding a domain name in the URL with which the confidence measure is associated, and wherein each path of the finite state machine represents a possible string the finite state machine can match, and wherein each path has an associated cost, the cost being inversely related to the likelihood of the path; and after verifying the target URL, adding the target URL to the corresponding business record in the business directory database.

* * * * *